(12) United States Patent
Jin et al.

(10) Patent No.: US 10,491,706 B2
(45) Date of Patent: Nov. 26, 2019

(54) METHOD AND SYSTEM FOR PROCESSING SERVICE REQUEST MESSAGES BASED ON QUEUING INFORMATION

(71) Applicant: HEWLETT PACKARD ENTERPRISE DEVELOPMENT LP, Houston, TX (US)

(72) Inventors: Xiaoting Jin, Beijing (CN); Wei Wang, Beijing (CN)

(73) Assignee: Hewlett Packard Enterprise Development LLP, Houston, TX (US)

( * ) Notice: Subject to any disclaimer, the term of this patent is extended or adjusted under 35 U.S.C. 154(b) by 223 days.

(21) Appl. No.: 15/505,468

(22) PCT Filed: Aug. 18, 2015

(86) PCT No.: PCT/CN2015/087418
§ 371 (c)(1),
(2) Date: Feb. 21, 2017

(87) PCT Pub. No.: WO2016/026436
PCT Pub. Date: Feb. 25, 2016

(65) Prior Publication Data
US 2017/0272538 A1    Sep. 21, 2017

(30) Foreign Application Priority Data
Aug. 20, 2014    (CN) .......................... 2014 1 0411906

(51) Int. Cl.
*H04L 29/08*    (2006.01)
*H04L 29/06*    (2006.01)

(52) U.S. Cl.
CPC .............. *H04L 67/32* (2013.01); *H04L 67/42* (2013.01)

(58) Field of Classification Search
CPC ..... H04L 47/50; H04L 47/566; H04L 47/622; H04L 2012/5681
See application file for complete search history.

(56) References Cited

U.S. PATENT DOCUMENTS 6,510,160 B1 *  1/2003  Nikuie ............... H04Q 11/0478
                                                       370/232
6,724,885 B1 *  4/2004  Deutsch .................. H04M 3/48
                                                       379/209.01
(Continued)

FOREIGN PATENT DOCUMENTS

| CN | 102833257 | * | 8/2012 | ............ H04L 29/06 |
| CN | 102833257 | | 12/2012 | |
| CN | 102946350 | | 2/2013 | |

OTHER PUBLICATIONS

International Searching Authority, "Notification of Transmittal of the International Search Report and the Written Opinion", PCT/CN2015/087418, dated Nov. 24, 2015, 7 pages.

*Primary Examiner* — Aftab N. Khan

(57) ABSTRACT

There is a service providing method applicable to a server, comprises: receiving a service request message of a client; allocating queuing information for the client, recording a correspondence relationship between the queuing information and a source address of the service request message, and transmitting the queuing information to the client, if the service request message carries no queuing information; and verifying a correspondence relationship between the queuing information and the source address of the service request message if the service request message carries the queuing information, and determining a service priority of the client according to the queuing information if the client passes the verification.

11 Claims, 5 Drawing Sheets

(56) References Cited

U.S. PATENT DOCUMENTS

| | | | | |
|---|---|---|---|---|
| 7,990,978 B1* | 8/2011 | Chamas | ............... | H04L 47/525 |
| | | | | 370/395.21 |
| 10,172,068 B2* | 1/2019 | Mosko | ............... | H04W 40/04 |
| 2002/0089931 A1* | 7/2002 | Takada | ............... | H04L 47/10 |
| | | | | 370/232 |
| 2002/0176431 A1* | 11/2002 | Golla | ............... | H04L 49/254 |
| | | | | 370/412 |
| 2003/0093509 A1* | 5/2003 | Li | ............... | G06F 11/0727 |
| | | | | 709/223 |
| 2003/0149752 A1* | 8/2003 | Baldwin | ............... | H04L 29/06 |
| | | | | 709/223 |
| 2003/0189930 A1* | 10/2003 | Terrell | ............... | H04L 45/00 |
| | | | | 370/389 |
| 2007/0115915 A1* | 5/2007 | Sheng | ............... | H04W 72/10 |
| | | | | 370/350 |
| 2010/0020820 A1* | 1/2010 | Jones | ............... | H04L 47/10 |
| | | | | 370/465 |
| 2014/0270138 A1* | 9/2014 | Uba | ............... | H04M 3/5233 |
| | | | | 379/265.06 |
| 2015/0277964 A1* | 10/2015 | Atkins | ............... | G06Q 40/00 |
| | | | | 718/101 |

\* cited by examiner

METHOD AND SYSTEM FOR PROCESSING SERVICE REQUEST MESSAGES BASED ON QUEUING INFORMATION

BACKGROUND

The emergence of cloud computing has imposed a revolutionary influence upon the development of the information industry. Due to the high-speed transmission capacity of the Internet, Cloud computing enables processing of data from a personal computer or a private server to be transferred to a large cloud computing center, and the computing capacity and the storage capacity to be provided for a user as services, so that the user can purchase and access the computing capacity like a power grid, a water supply and other public services.

SUMMARY

DETAILED DESCRIPTION OF THE EMBODIMENTS

Figure 1:
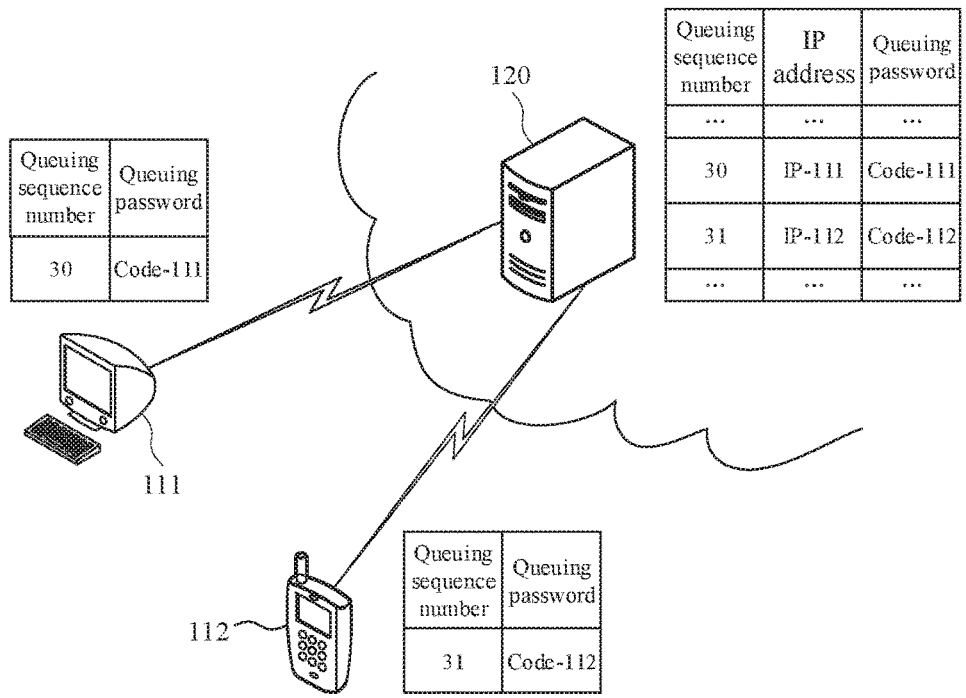
FIG. 1 illustrates a schematic structural diagram of a deployed network of a cloud service in an example.

Referring to FIG. 1, the network illustrated in FIG. 1 includes a server 120 providing a service, accessed by a user using a browser on a computer client 111, and by another user using an application on a handset client 112 in the form of a webpage over the network, for example, if the user submits a browse request or an order, then the server 120 provides a corresponding service in response to the request of the client, for example, by returning a webpage to be accessed by the client or processing the order of the client.

If an enterprise purchases cloud service resources supporting 10,000 online users concurrently, then when there are 10,000 clients accessing concurrently, the server 120 will reject any service to be provided for a client subsequently requesting for an access. The client rejected for the service typically will request again for the service repeatedly, and processing resources of the server 120 will be consumed for rejecting these accesses beyond the capacity, thus degrading the efficiency of processing the accesses of the first 10,000 clients. Thus too many concurrent connections will tend to come with a vicious circle in that the processing speed may become lowered with an increasing number of clients requesting for an access.

Figure 2:
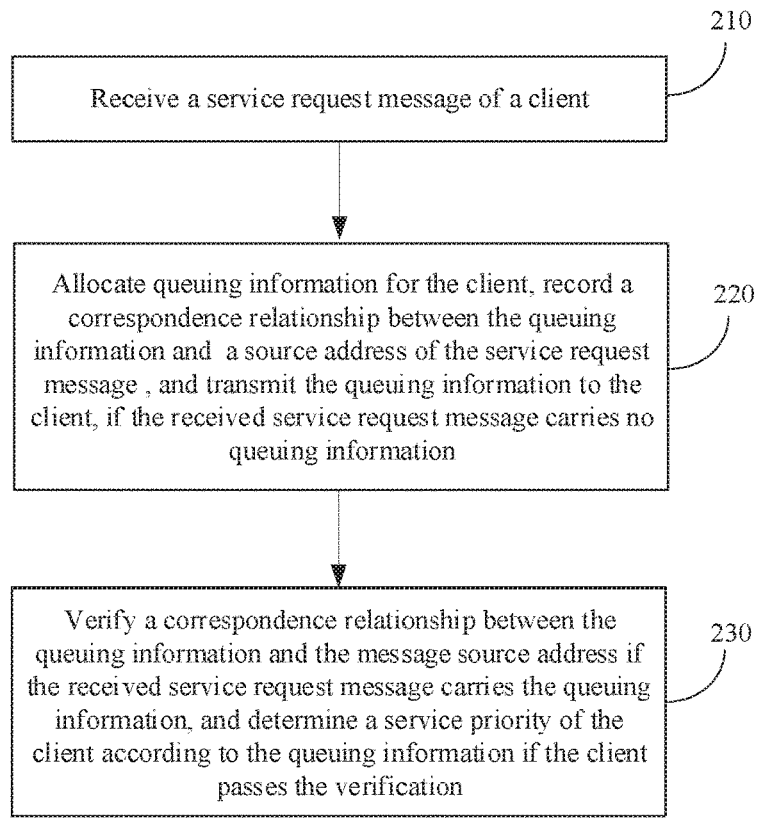
FIG. 2 illustrates a flow chart of a service providing method applicable to a server in an example.

Referring to FIG. 2, a service providing method applicable to a server as illustrated in FIG. 2 can be applicable to a server and include the following blocks:

The block 210 is for receiving a service request message of a client;

The block 220 is for allocating queuing information for the client, to record a correspondence relationship between the queuing information and a source address of the service request message, and to transmit the queuing information to the client, if the received service request message carries no queuing information; and The block 230 is for verifying a correspondence relationship between the queuing information and the message source address if the received service request message carries the queuing information, and to determine a service priority of the client according to the queuing information if the client passes the verification.

Thus in this disclosure, the server can provide the client with the different services according to the received service request message carries the queuing information to thereby better satisfy a demand of the client and improve the efficiency of providing the client with the service by the server.

Figure 3:
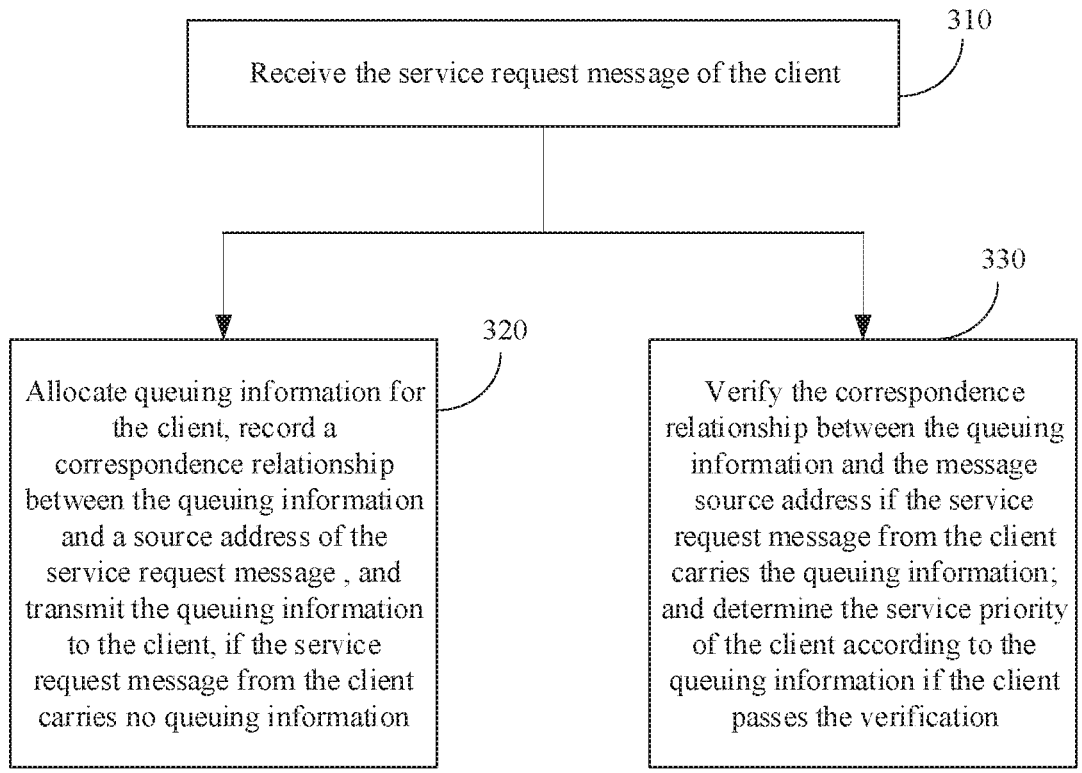
FIG. 3 illustrates a flow chart of a service providing method applicable to a server on a server in an example.
Figure 4:
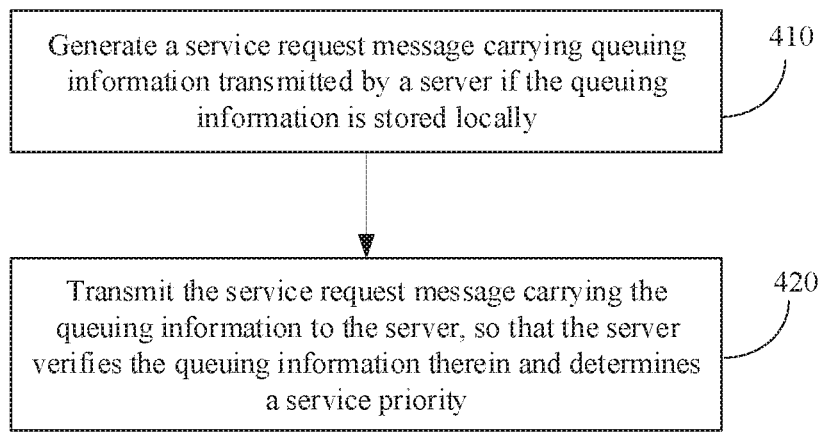
FIG. 4 illustrates a flow chart of a method r accessing a service by a client in an example.

Referring to FIG. 3 and FIG. 4, a client generates a service request message carrying queuing information transmitted by a server if the queuing information is stored locally at block 410.

The client generates the service request message before requesting the server for service. The client firstly searches locally for queuing information received from the server, and if there is queuing information received from the server, then the client encapsulates the stored queuing information into the service request message to be transmitted to the server, in a predetermined format; otherwise, then the client generates a normal service request message carrying no queuing information. No matter whether the service request message carries the queuing information, the service request message carries an address of the client, e.g., an IP address, so that the service request message will be transmitted normally over a network.

In an example, the queuing information stored locally by the client includes a queuing sequence number transmitted by the server, and the generated service request message carries the queuing sequence number; and in another example, the queuing information stored locally by the client includes a queuing sequence number, and a queuing password corresponding to the queuing sequence number, transmitted by the server, and the generated service request message carries the queuing sequence number and the corresponding queuing password.

The service request message can include different contents in different formats dependent upon a particular protocol, and a particular type of service, applied between the server and the client, although the invention will not be limited to this example.

The client transmits the service request message carrying the queuing information to the server, so that the server verifies the queuing information therein and determines a service priority at block 420.

The server receives the service request message of the client at block 310.

The server allocates queuing information for the client, records a correspondence relationship between the queuing information and a source address of the service request message, and transmits the queuing information to the client, if the service request message from the client carries no queuing information at block 320.

If the service request message transmitted by the clients carries no queuing information, then the server determines that this is a service request initially initiated by the client, allocates queuing information for the client, and transmits the allocated queuing information to the client. In order to enable the client to be identified correctly in a service request subsequently initiated by the client, the correspondence relationship between the queuing information and the source address of the service request message (e.g., an IP address) to be recorded on the server.

In an example, the server allocates the queuing information including a queuing sequence number for the client. Typically only one queuing sequence number is allocated on the server for the same source address so that respective clients can be provided with a fair queuing environment. Alternatively more than one queuing sequence number can be allocated for the same source address.

The server can allocate queuing sequence numbers sequentially in an ascending order for the respective clients in an order that they initiate requests; or can queue the clients into different queues according to user levels of the clients, types of requested services, etc., and allocate queuing sequence numbers for the clients in the respective queues.

In another example, in order to further enhance security, the queuing sequence number can be configured with a corresponding queuing password, and the queuing information allocated by the server for the client includes the queuing sequence number and the corresponding queuing password. If the service request message transmitted by the client carries no queuing information, then the queuing sequence number is allocated for the client, and the queuing password corresponding to the queuing sequence number, and the source address of the service request message is generated. In this example, the server records a correspondence relationship between the queuing sequence number, the queuing password, and the source address of the service request message, and transmits the queuing sequence number and the corresponding queuing password to the client, so that the client will initiate a service request next time by carrying the queuing sequence number and the queuing password in the service request message. The server can generate the queuing password in a number of ways, for example, several queuing passwords can be preset and applied alternatively on the server; and in another example, the queuing password can be generated on the server with the queuing sequence number and/or the source address of the service request message being parameters in a predetermined encryption algorithm.

In an example, the server can enable a queuing mechanism after the system utilization ratio exceeds a preset threshold, and after the queuing mechanism is enabled, the server will allocate the queuing information for the client and transmit the queuing information to the client, records the correspondence relationship between the queuing information and the source address of the request message, and also provide the service by determining a service order of the client according to the queuing information. If the system utilization ratio does not exceed the preset threshold, then the server provide the client with the service instead of allocating the queuing information. Different parameters can be selected as an index to evaluate the system utilization ratio, and corresponding thresholds can be preset, for particular application scenarios; for example, the system utilization ratio can be calculated from the maximum processing capacity of the system which is the largest number of requests in the SPEC Web (criterions to evaluate the processing capacity of a Web server) series, or which is the number of transactions processed in a unit period of time in the Transaction Processing Performance Council (TPC)-C, or which is the number of users accessing the service to which they subscribe, or the like.

The server can estimate a period of time in which the service request of the client can be processed, according to the processing speed of the server, and the queuing sequence number of the client, and transmit a possible wait period of time to the client together with the queuing information.

The server can process the service request message of the client by putting it into a queue of tasks waiting for processing as in the prior art.

The client can store the queuing information transmitted by the server locally upon reception of the queuing information.

When the service request message transmitted by the client carries no queuing information, the server can return the queuing information to the client. If the client receives the queuing information transmitted by the server, then the client will store the queuing information locally, so that the client will generate a service request message locally by carrying the queuing information.

The queuing information can include the queuing sequence number or include the queuing sequence number and the queuing password.

The client can display the queuing sequence number to the user. If the message returned by the server further carries the wait period of time estimated by the server, then the client can display it to the user together with the queuing sequence number; and the client can also initiate a service request again automatically according to the estimated wait period of time.

At block 330, the server verifies the correspondence relationship between the queuing information and the message source address if the service request message from the client carries the queuing information; and determines the service priority of the client according to the queuing information if the client passes the verification.

If the service request message carries the queuing information, then the server extracts the queuing information in the message and the source address of the message, and compares them with the recorded correspondence relationship between the queuing information and the source address to verify the client transmitting the service request message. If the queuing information and the source address of the message agree with the record, then the client passes the verification, and the client determines the priority at which the client is provided with the service, according to the queuing information.

If the client fails to pass the verification, then the server can reject the service or can treat the client as a client initially initiating a service request, reallocate queuing information for the client, record a correspondence relationship between the queuing information, and a source address of the service request message, and transmit the queuing information to the client.

In an example, the service request message transmitted by the client carries the queuing sequence number. There may be one or more queues of tasks on the server to store service requests waiting for processing, dependent upon how the server allocates the queuing sequence number. The server puts the queuing request of the client into the matching queue of tasks at a corresponding position according to the queuing sequence number so that the client is provided with the service at the priority at which the queuing sequence number is allocated. If there are a plurality of queues of tasks, then the client can be scheduled among the plurality of queues of tasks in any one of a number of ways, although this disclosure will not be limited to this example.

In another example, the service request message transmitted by the client carries the queuing sequence, and the queuing password corresponding to the queuing sequence number. At this time the server will compare the source address, the queuing sequence number, and the queuing password in the service request message with the recorded correspondence relationship between the source address, the queuing sequence number, and the queuing password, and only if all of them agree, then the client will pass the verification.

The queuing information can become more temporal due to a survival time. For example, the survival time can be preset on the server for the recorded queuing information, and when the survival time expires, the recorded correspondence relationship between the queuing information and the source address of the service request message can be removed. Thus if the service request message carrying the queuing information for which the survival time expires arrives at the server, then the client will fail to pass the verification, and at this time the server can reallocate queuing information for the client. In another example, a survival time can be set on the client for the stored queuing information, or the survival time of the queuing information can be specified by the server while transmitting the queuing information; and when the survival time expires, the client can remove the locally stored queuing information. Thus after the survival time of the queuing information expires, the client will transmit the service request message carrying no queuing information and obtain queuing information again from the server. A survival time can be preset on both the server and the client for the queuing information for the same effect, so a repeated description thereof will be omitted here. If the queuing information is provided with a survival time, then the server can transmit the queuing information to the client by instructing the client to reinitiate a service request before the survival time expires to thereby avoid the client from being queued again.

After the server issues the queuing information, the client can know a task processing condition on the server to thereby avoid a service request from being initiated repeatedly so as to lower the number of tasks to be processed by the server and improve the response speed of the server.

Figure 5:
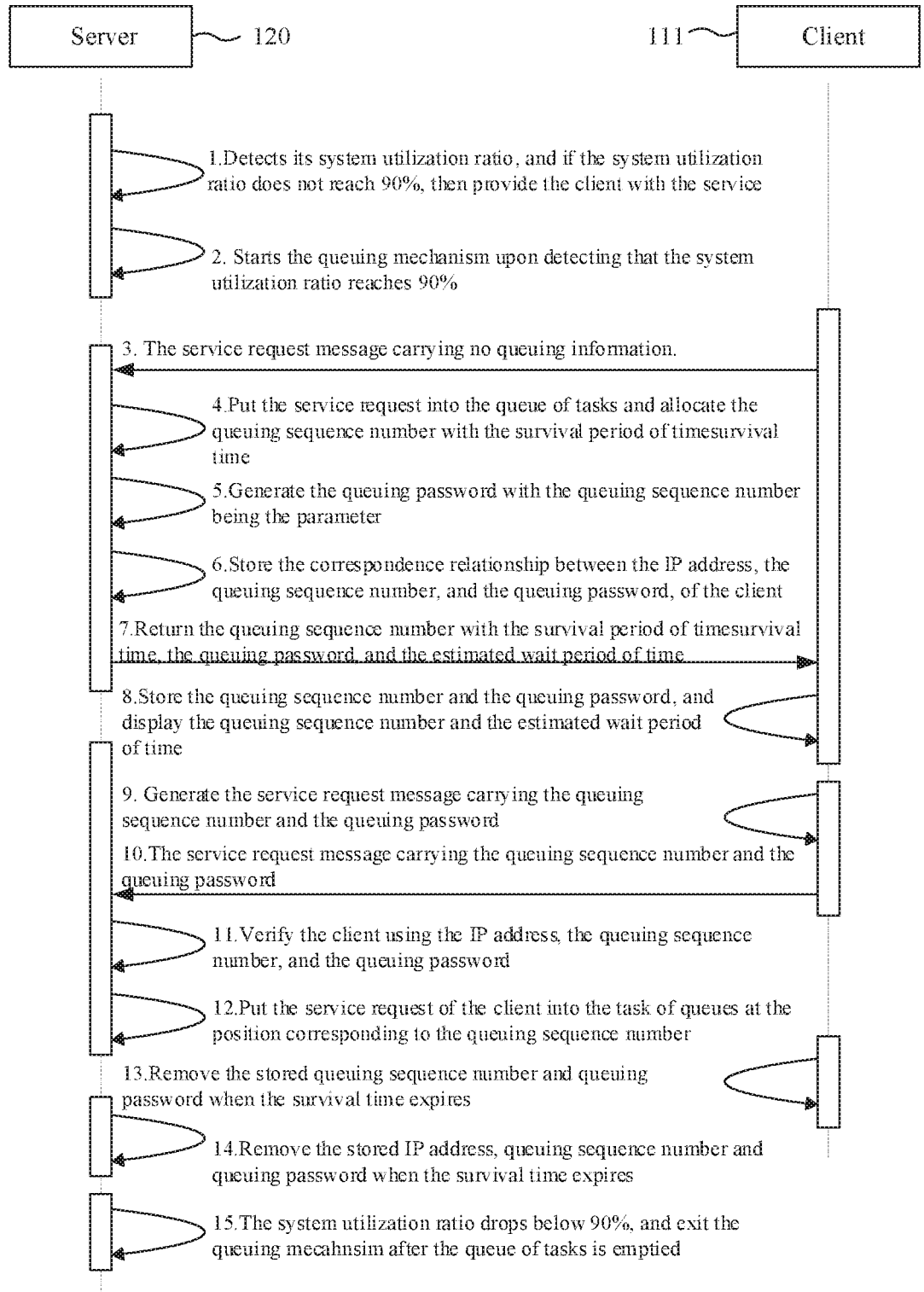
FIG. 5 illustrates a schematic flow chart of processing by and interaction between a client and a server in an example.

In an example of this disclosure, the clients 111 and 112 access the service provided by the server 120 in the form of a webpage in the network illustrated in FIG. 1. A secret key is preset on the server 120 to encrypt the queuing sequence number: Key1. An interaction flow between the client 111 and the server 120 is as illustrated in FIG. 5.

1) The server 120 detects its system utilization ratio, and if the system utilization ratio does not reach 90%, then the server 120 responds to the service request of the client, and provides the client with the corresponding service.

2) The server 120 starts the queuing mechanism upon detecting that the system utilization ratio reaches 90%.

3) The client 111 accesses the service provided by the server 120 through the browser by transmitting the service request message to the server 120. The client 120 is initially accessed by the client 111, so the client 111 has not stored locally any queuing information, and the service request message transmitted by the client 111 carries no queuing information.

4) The server 120 receives the service request message of the client 111, and puts the service request of the client 111 into the local queue of tasks to wait for processing. The server 120 extracts the IP address in the message, and allocates the unique queuing sequence number with the survival time for the client. The server 120 allocates the queuing sequence numbers in an ascending order according to the sequential order that the service request messages arrive at the server, so that only one queuing sequence number is allocated for each IP address.

For example, the server 120 allocates the queuing sequence number of 30 for the client 111, and the queuing sequence number of 31 for the subsequently arriving client 112.

5) The server 120 executes the encryption algorithm with the queuing sequence number of 30 and the Key1 being parameters to derive the unique queuing password of Code-111 corresponding to the queuing sequence number.

6) The server 120 stores the correspondence relationship between the IP address of IP-111 of the client 111, the queuing sequence number 30, and the queuing password of Code-111.

7) The server 120 returns the queuing sequence number of 30 with the survival time, the queuing password of Code-111, and the estimated wait period of time to the client 111.

8) The client 111 stores locally the queuing sequence number 30, and the queuing password of Code-111, transmitted by the server 120, for example, in cookie. The client 111 displays the queuing sequence number of 30 and the estimated wait period of time to the user, and alerts the user that the service requested by the user is waiting for processing.

9) The client 111 requests again for the service after the estimated wait period of time elapses, and since the queuing information is stored locally, the client 111 generates a service request message by encapsulating the queuing sequence number of 30 and the queuing password of Code-111 into the message.

10) The client 111 transmits the service request message carrying the queuing sequence number 30 and the queuing password of Code-111 to the server 120.

11) The server 120 extracts the source IP address, the queuing sequence number of 30, and the queuing password of Code-11 from the received service request message, and searches the stored correspondence relationships for the matching record to verify the client 111. The server 120 locates the matching record, so the client 111 passes the verification.

12) The server 120 puts the service request of the client 111 into the queue of tasks at the position corresponding to the queuing sequence number 30 to thereby queue it in sequence.

13) The survival time of the queuing sequence number 30 expires on the client 111, and the client 111 removes the locally stored correspondence relationship between the queuing sequence number 30 and the queuing password of code-111.

14) When the survival time of the queuing sequence number 30 expires on the server 120, the server 120 removes the locally stored correspondence relationship between the IP address of IP-111, the queuing sequence number 30, and the queuing password of Code-111.

15) The server 120 detects that the system utilization ratio drops below 90%, and exits the queuing mechanism after the queue of tasks is emptied. The serer 120 will not allocate any queuing information for the client requesting for the service after exits the queuing mechanism.

In this example, the server allocates a unique queuing sequence number for the IP address of the client, and the queuing password corresponding thereto, and notifies the user of the estimated wait period of time, so that the client will not frequently refresh the service request to thereby alleviate a burden on the server so as to guarantee a response speed to the client connected with the server; and moreover the user provided with the feedback information of the service being queued can anticipate a service period of time to thereby improve the experience of the user.

Figure 6:
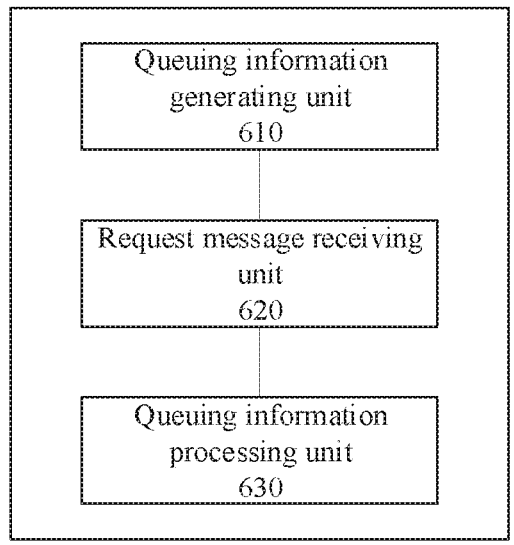
FIG. 6 illustrates a logic structural diagram of a service providing device applicable to a server in an example.

FIG. 6 illustrates a service providing device applicable to a server in an example of this disclosure, applicable to a server, which includes a request message receiving unit 610, a queuing information generating unit 620, and a queuing information processing unit 630, where:

The request message receiving unit 610 is configured to receive a service request message of a client;

The queuing information generating unit 620 is configured to allocate queuing information for the client, to record a correspondence relationship between the queuing information and a source address of the service request message, and to transmit the queuing information to the client, if the service request message carries no queuing information; and The queuing information processing unit 630 is configured to verify a correspondence relationship between the queuing information and the message source address if the received service request message carries the queuing information, and to determine a service priority of the client according to the queuing information if the client passes the verification.

In an example, the queuing information generating unit 620 includes a queuing mechanism executing module configured to allocate the queuing information for the client when a system utilization ratio of the server exceeds a preset threshold, and the service request message carries no queuing information.

The device can further include a verification failure handling unit configured to reallocate queuing information for the client, to record a correspondence relationship between the queuing information and the message source address, and to transmit the queuing information to the client, when the client fails to pass the verification.

In an example, there is a survival time of the queuing information; and in this example, the device further includes a survival time processing unit configured to remove the recorded correspondence relationship between the queuing information and the message source address when the survival time of the queuing information expires.

The queuing information comprises a queuing sequence number; or the queuing information comprises a queuing sequence number and a queuing password.

Figure 7:
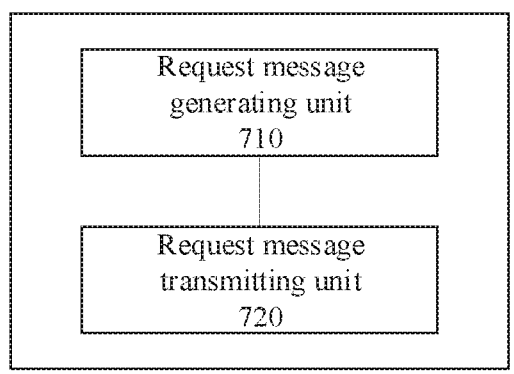
FIG. 7 illustrates a logic structural diagram of a device for accessing a service in an example.

FIG. 7 illustrates a device for accessing a service in an example of this disclosure, applicable to a client, which includes a request message generating unit 710 and a request message transmitting unit 720, where:

The request message generating unit 710 is configured to generate a service request message carrying queuing information transmitted by a server if the queuing information is stored locally; and The request message transmitting unit 720 is configured to transmit the service request message carrying the queuing information to the server, so that the server verifies the queuing information therein and determines a service priority.

In an example, there is a survival time of the queuing information; and in this example, the device further includes a survival time processing unit configured to remove the stored queuing information when the survival time of the queuing information expires.

The queuing information comprises a queuing sequence number; or the queuing information comprises a queuing sequence number and a queuing password.

Figure 8:
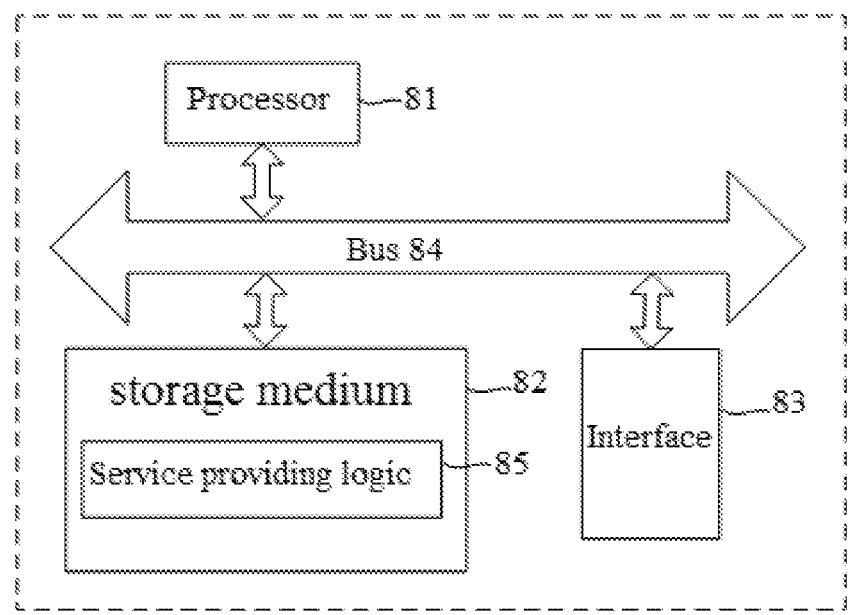
FIG. 8 illustrates a schematic hardware architectural diagram of a service providing device applicable to a server in an example.

FIG. 8 illustrates a schematic hardware architectural diagram of a service providing device applicable to a server in an example, which can be applicable to a server.

In this example, the device for providing a service includes a processor such as a CPU 81 and a non-transitory storage medium 82. The non-transitory storage medium 82 may for example be a memory, hard disk or other storage device. The processor 81 and the non-transitory storage medium 82 are communicatively connected with each other by an internal bus 84. The device for providing a service according to this disclosure my include further hardware components, e.g., a communication interface 83 via which data is received or transmitted, etc.

As shown in FIG. 8, the non-transitory storage medium 82 may store service providing logic 85 in the form of machine readable instructions, which are executable by the processor 81. The service providing logic 85 may for example correspond to the request message receiving unit 610, a queuing information generating unit 620, and a queuing information processing unit 630 in FIG. 6. In one example, the processor 81 reads the instructions corresponding to the service providing logic 85 stored in the non-transitory storage medium 82 and executes the instructions to perform the operations of:

Receiving unit a service request message of a client;

Allocating queuing information for the client, recording a correspondence relationship between the queuing information and a source address of the service request message, and transmitting the queuing information to the client, if the service request message carries no queuing information; and Verifying a correspondence relationship between the queuing information and the message source address if the received service request message carries the queuing information, and determining a service priority of the client according to the queuing information if the client passes the verification.

In an example, the processor 81 reads the instructions corresponding to the service providing logic 85 stored in the storage medium 82 to allocate the queuing information for the client by:

Allocating the queuing information for the client when a system utilization ratio of the server exceeds a preset threshold, and the service request message carries no queuing information.

In an example, the processor 81 reads the machine readable instructions corresponding to the service providing logic 85 stored in the storage medium 82 to further reallocate queuing information for the client, to record a correspondence relationship between the queuing information and the message source address, and to transmit the queuing information to the client, when the client fails to pass the verification.

In an example, when there is a survival time of the queuing information, the processor 81 reads the machine readable instructions corresponding to the service providing logic 85 stored in the storage medium 82 to further:

To remove the recorded correspondence relationship between the queuing information and the message source address when the survival time of the queuing information expires.

In an example, the processor 81 reads the machine readable instructions corresponding to the service providing logic 85 stored in the storage medium 82, where the queuing information comprises a queuing sequence number; or the queuing information comprises a queuing sequence number and a queuing password.

The foregoing disclosure is merely illustrative of preferred embodiments of the disclosure but are not intended to limit the disclosure, and any modifications, equivalent substitutions, adaptations, thereof made without departing from the spirit and scope of the disclosure shall be encompassed in the claimed scope of the appended claims.

The invention claimed is:

1. A service providing method applicable to a server, the method comprising:
  receiving a first message indicating a service request of a client;
  in response to determining that the first message carries no queue-identifying information:
    allocating queue-identifying information for the client;
    determining an estimated wait time after which the service request may be executed;
    recording a correspondence relationship between the queue-identifying information and a source address of the first message; and
    transmitting the queue-identifying information and the estimated wait time to the client;
  receiving, after the estimated wait time has elapsed, a second message indicating the service request of the client; and
  in response to determining that the second message carries the queue-identifying information:
    in response to determining that a received correspondence relationship between the queue-identifying information and the source address of the second message matches the recorded correspondence relationship, determining a service priority of the client according to the queue-identifying information.

2. The method according to claim 1,
  wherein allocating the queue-identifying information for the client is further in response to determining that a system utilization ratio of the server exceeds a preset threshold.

3. The method according to claim 1, wherein in response to determining that the received correspondence relationship between the queue-identifying information and the source address of the second message matches the recorded correspondence relationship, the method further comprises:
  reallocating queue-identifying information for the client;
  recording a correspondence relationship between the reallocated queue-identifying information and the source address of the second message; and
  transmitting the reallocated queue-identifying information to the client.

4. The method according to claim 1, wherein the queue-identifying information comprises a survival time, and wherein the method further comprises:
  removing the recorded correspondence relationship between the queue-identifying information and the source address of the first message when the survival time of the queue-identifying information expires.

5. The method according to any one of claims 1 to 4, wherein:
  the queue-identifying information comprises a queuing sequence number; or
  the queue-identifying information comprises a queuing sequence number and a corresponding queuing password which is based on the queuing sequence number.

6. A service providing device, comprising a processor and a non-transitory storage medium storing machine readable instructions executable by the processor to perform the operations of:
  receiving a first message indicating a service request of a client;
  in response to determining that the first message carries no queue-identifying information:
    allocating queue-identifying information for the client;
    determining an estimated wait time after which the service request may be executed;
    recording a correspondence relationship between the queue-identifying information and a source address of the first message; and
    transmitting the queue-identifying information and the estimated wait time to the client;
  receiving, after the estimated wait time has elapsed, a second message indicating the service request of the client; and
  in response to determining that the second message carries the queue-identifying information:
    in response to determining that a received correspondence relationship between the queue-identifying information and the source address of the second message matches the recorded correspondence relationship, determining a service priority of the client according to the queue-identifying information.

7. The device according to claim 6,
  wherein allocating the queue-identifying information for the client is further in response to determining that a system utilization ratio of the server exceeds a preset threshold.

8. The device according to claim 6, wherein instructions further includes instructions to, in response to determining that the received correspondence relationship between the queue-identifying information and the source address of the second message matches the recorded correspondence relationship:
  reallocate queue-identifying information for the client;
  record a correspondence relationship between the reallocated queue-identifying information and the source address of the second message; and
  transmit the reallocated queue-identifying information to the client.

9. The device according to claim 6, wherein the queue-identifying information comprises a survival time, and wherein the instructions includes instructions to:
  remove the recorded correspondence relationship between the queue-identifying information and the source address of the first message when the survival time of the queue-identifying information expires.

10. The device according to claim 6, wherein:
  the queue-identifying information comprises a queuing sequence number; or
  the queue-identifying information comprises a queuing sequence number and a corresponding queuing password which is based on the queuing sequence number.

11. A non-transitory storage medium storing machine readable instructions which are executable by a processor to:
  receive a first message indicating a service request of a client;
  in response to determining that the first message carries no queue-identifying information:
    allocate queue-identifying information for the client;
    determine an estimated wait time after which the service request may be executed;
    record a correspondence relationship between the queue-identifying information and a source address of the first message; and
    transmit the queue-identifying information and the estimated wait time to the client;

receive, after the estimated wait time has elapsed, a second message indicating the service request of the client; and in response to determining that the second message carries the queue-identifying information:
    in response to determining that a received correspondence relationship between the queue-identifying information and the source address of the second message matches the recorded correspondence relationship, determine a service priority of the client according to the queue-identifying information.

\* \* \* \* \*